US009665605B2

(12) United States Patent
Kogan et al.

(10) Patent No.: US 9,665,605 B2
(45) Date of Patent: May 30, 2017

(54) METHODS AND APPARATUS FOR BUILDING A SEARCH INDEX FOR A DATABASE

(71) Applicant: kCura Corporation, Chicago, IL (US)

(72) Inventors: Mikhail Kogan, Chicago, IL (US); Michael B. Goldstein, Chicago, IL (US); Vidhyapriya Govindarajan, Skokie, IL (US); Keith L. Kaminski, Mount Prospect, IL (US); Mason D. May, Chicago, IL (US); Fatima Z. Mecci, Chicago, IL (US); Nikita Solilov, Schaumburg, IL (US); Kyle A. Stachowiak, Chicago, IL (US)

(73) Assignee: KCURA LLC, Chicago, IL (US)

( * ) Notice: Subject to any disclaimer, the term of this patent is extended or adjusted under 35 U.S.C. 154(b) by 310 days.

(21) Appl. No.: 14/481,357

(22) Filed: Sep. 9, 2014

(65) Prior Publication Data
US 2016/0070727 A1 Mar. 10, 2016

(51) Int. Cl.
*G06F 17/30* (2006.01)

(52) U.S. Cl.
CPC .............................. *G06F 17/30312* (2013.01)

(58) Field of Classification Search
CPC combination set(s) only.
See application file for complete search history.

(56) References Cited

U.S. PATENT DOCUMENTS

| 5,930,794 A * | 7/1999 | Linenbach | G06F 17/30377 |
| 6,457,018 B1 * | 9/2002 | Rubin | G06F 17/30607 707/742 |
| 2006/0036574 A1 * | 2/2006 | Schweigkoffer | G06F 17/30356 |
| 2008/0306919 A1 * | 12/2008 | Iwayama | G06F 17/30657 |
| 2009/0112795 A1 * | 4/2009 | Abraham | G06F 17/30536 |
| 2009/0182779 A1 * | 7/2009 | Johnson | G06F 17/30383 |
| 2014/0081934 A1 * | 3/2014 | Mizell | G06F 17/30348 707/696 |

* cited by examiner

*Primary Examiner* — Etienne LeRoux
(74) *Attorney, Agent, or Firm* — Marshall, Gerstein & Borun LLP; Randall G. Rueth

(57) ABSTRACT

Methods and apparatus for building a search index for a database are disclosed. When an incremental build trigger is detected (e.g., a threshold number of documents are added to database), the system determines which sub-indexes need to be updated and which sub-indexes do not need to be updated. Rather than update the affected sub-indexes directly, the system builds new sub-indexes to replace the affected sub-indexes. Database queries that occur during the generation of the replacement sub-indexes use the old sub-indexes. When the new sub-indexes are ready, the system moves pointers from the old sub-indexes to the new sub-indexes so that subsequent database queries use the new sub-indexes.

18 Claims, 4 Drawing Sheets

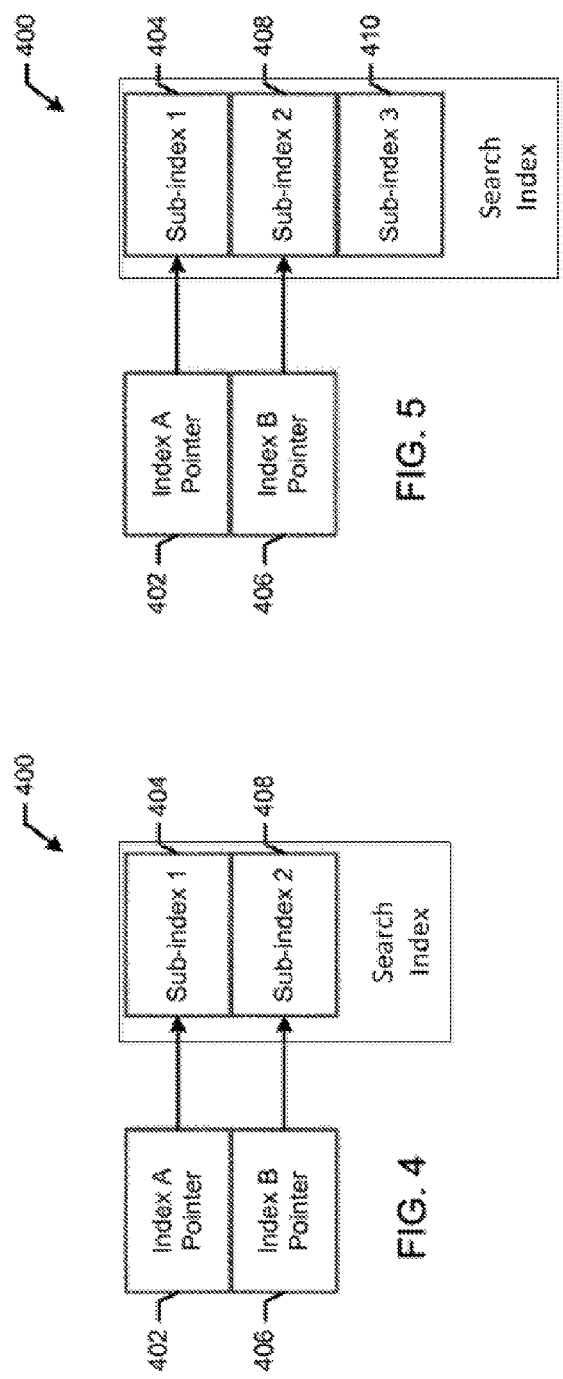
FIG. 4
FIG. 5
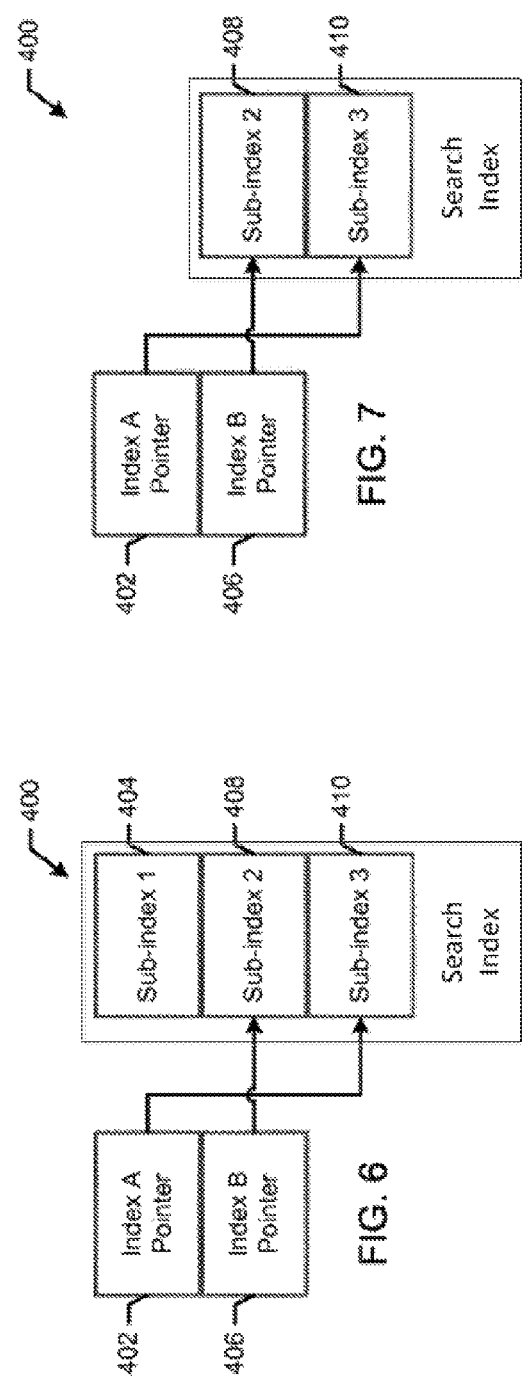
FIG. 6
FIG. 7

METHODS AND APPARATUS FOR BUILDING A SEARCH INDEX FOR A DATABASE

The present disclosure relates in general to databases, and, in particular, to methods and apparatus for building a search index for a database.

BACKGROUND

The vast majority of documents we create and/or archive are stored electronically. In order to quickly find certain documents, the relevant data from these documents is typically extracted, catalogued, and organized in a centralized database to make them searchable. In some circumstances, these databases can be very large. For example, a law suit may involve over a million documents. Searching these large databases can be problematic.

Depending on the size of the document collection, indexing the documents can take hours or even days. Once an index has been built, the index needs to be maintained as documents are added and/or deleted from the database. However, these incremental builds leave the database inoperable. As a result, incremental builds are not performed very often, which leaves portions of the database inaccurate.

BRIEF DESCRIPTION OF THE DRAWINGS

FIGS. 4-7 are block diagrams illustrating example index pointers and example sub-indexes.

DETAILED DESCRIPTION OF THE PREFERRED EMBODIMENTS

Briefly, methods and apparatus for building a search index for a database are disclosed. When an incremental build trigger is detected (e.g., a threshold number of documents are added to database), the system determines which sub-indexes need to be updated and which sub-indexes do not need to be updated. Rather than update the affected sub-indexes directly, the system builds new sub-indexes to replace the affected sub-indexes. Database queries that occur during the generation of the replacement sub-indexes use the old sub-indexes. When the new sub-indexes are ready, the system moves pointers from the old sub-indexes to the new sub-indexes so that subsequent database queries use the new sub-indexes.

Figure 1:
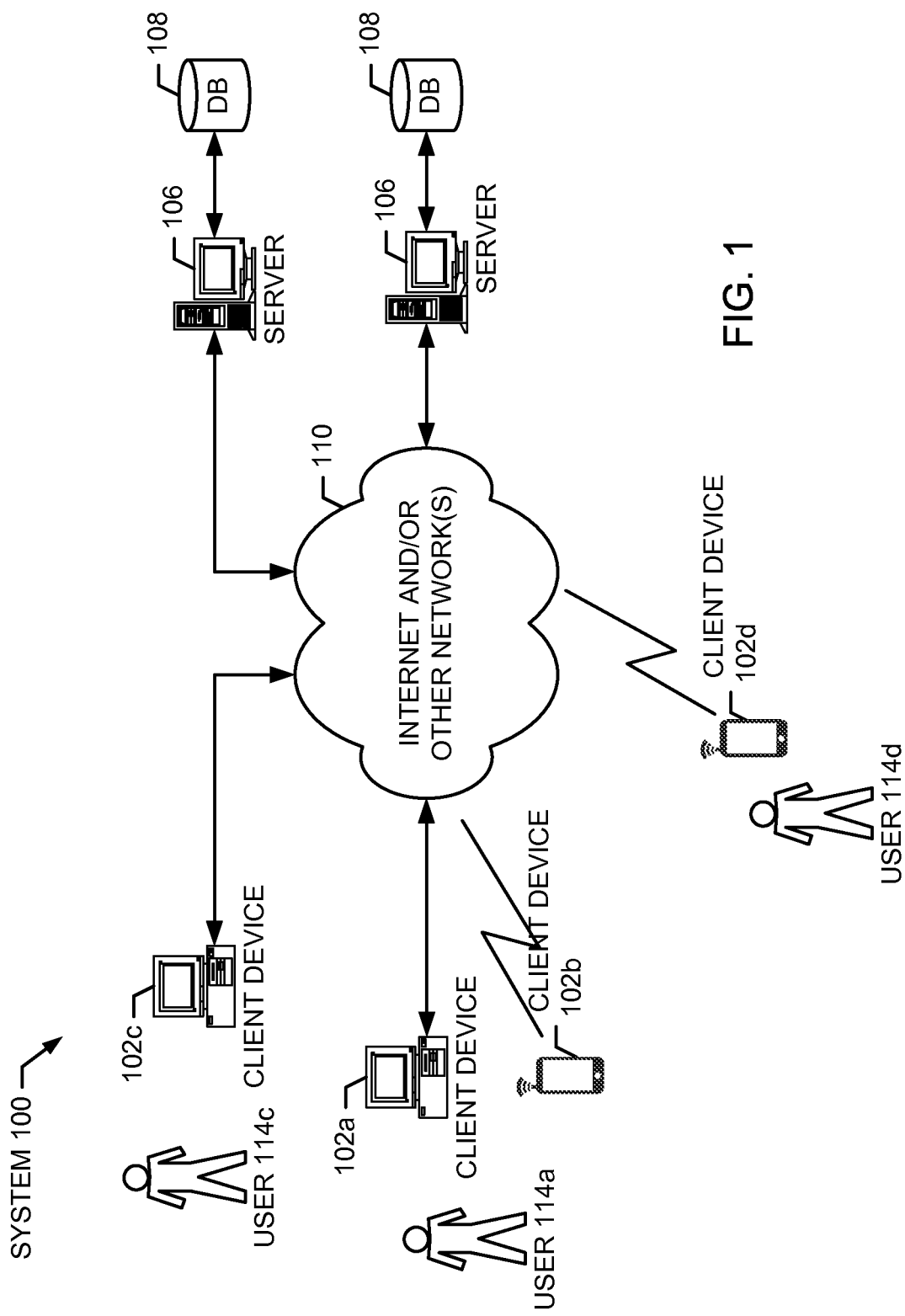
FIG. 1 is a block diagram of an example network communication system.

Turning now to the figures, the present system is most readily realized in a network communication system 100. A block diagram of certain elements of an example network communications system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

In this example, user 114a is using client device 102a and client device 102b. For example, user 114a may be reviewing documents displayed on a desktop display of client device 102a and coding those documents using a touch screen on client device 102b.

Figure 2:
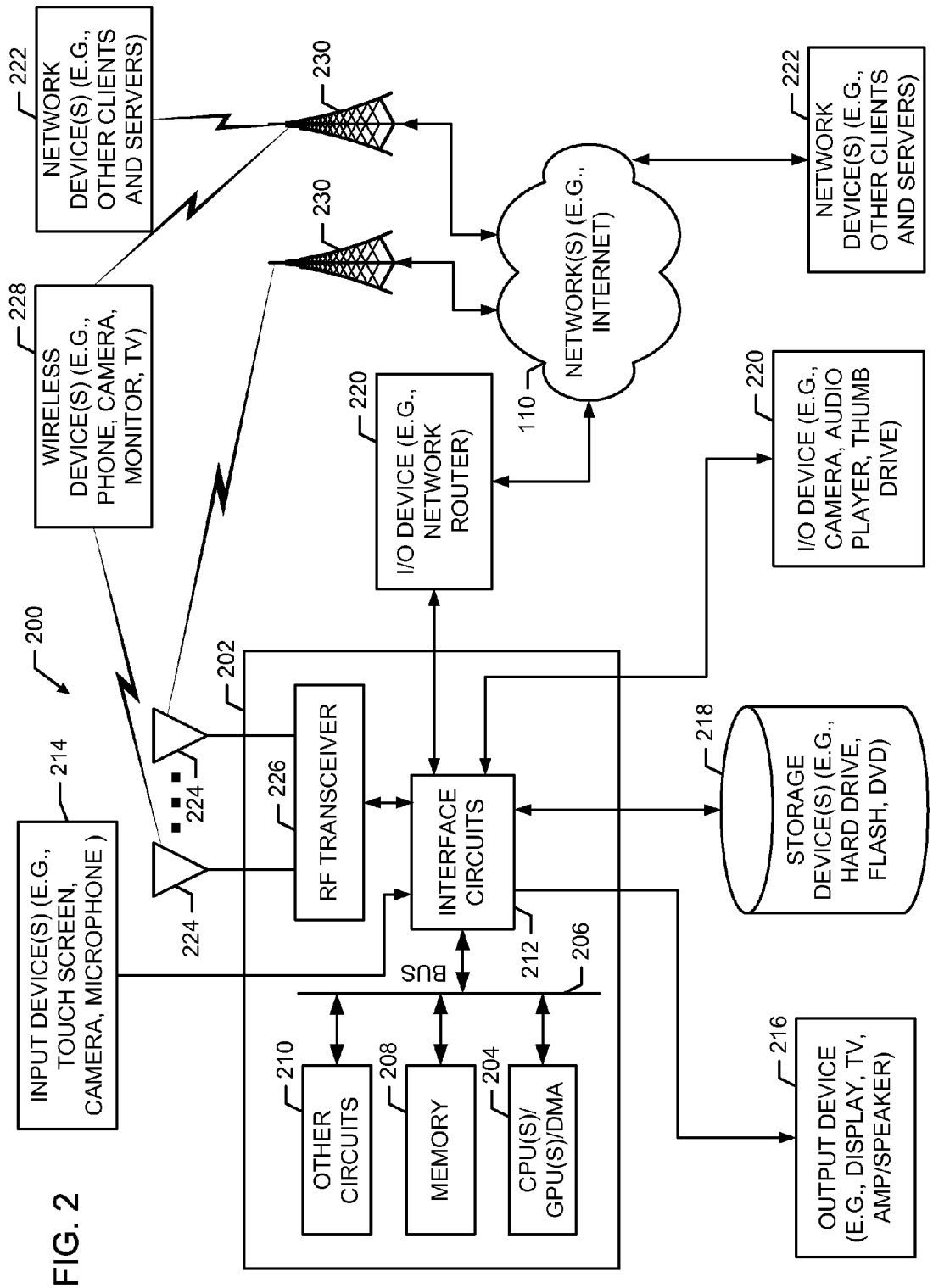
FIG. 2 is a block diagram of an example computing device.

Each of the devices illustrated in FIG. 1 (e.g., clients 102 and/or servers 106) may include certain common aspects of many computing devices such as microprocessors, memories, input devices, output devices, etc. FIG. 2 is a block diagram of an example computing device. The example computing device 200 includes a main unit 202 which may include, if desired, one or more processing units 204 electrically coupled by an address/data bus 206 to one or more memories 208, other computer circuitry 210, and one or more interface circuits 212. The processing unit 204 may include any suitable processor or plurality of processors. In addition, the processing unit 204 may include other components that support the one or more processors. For example, the processing unit 204 may include a central processing unit (CPU), a graphics processing unit (GPU), and/or a direct memory access (DMA) unit.

The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processing unit 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, camera, voice recognition system, accelerometer, global positioning system (GPS), and/or any other suitable input device.

One or more displays, printers, speakers, monitors, televisions, high definition televisions, and/or other suitable output devices 216 may also be connected to the main unit 202 via the interface circuit 212. One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the device 200. The computing device 200 may also exchange data with one or more input/output (I/O) devices 220, such as network routers, camera, audio players, thumb drives etc.

The computing device 200 may also exchange data with other network devices 222 via a connection to a network 110. The network connection may be any type of network connection, such as an Ethernet connection, digital subscriber line (DSL), telephone line, coaxial cable, wireless base station 230, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the device 200 may be a wireless device 200. In such an instance, the device 200 may include one or more antennas 224 connected to one or more radio frequency (RF) transceivers 226. The transceiver 226 may include one or more receivers and one or more transmitters operating on the same and/or different frequencies. For example, the device 200 may include a blue tooth transceiver 216, a Wi-Fi transceiver 216, and diversity cellular transceivers 216. The transceiver 226 allows the device 200 to exchange signals, such as voice, video and any other suitable data, with other wireless devices 228, such as a phone, camera, monitor, television, and/or high definition television. For example, the device 200 may send and receive wireless telephone signals, text messages, audio signals and/or video signals directly and/or via a base station 230.

Figure 3:
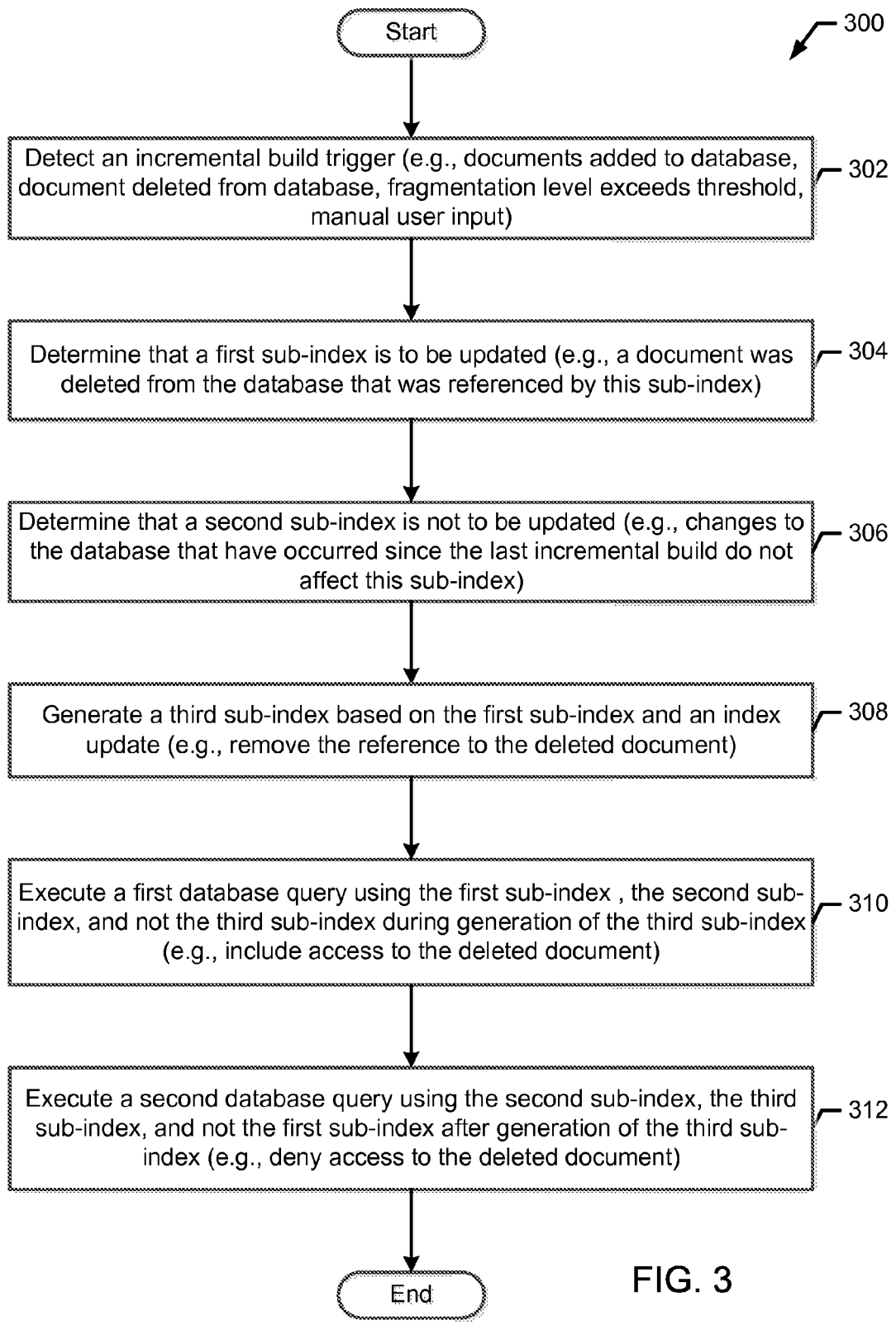
FIG. 3 is a flowchart of an example process for building a search index for a database.

FIG. 3 is a flowchart of an example process for building a search index for a database. The process 300 may be carried out by one or more suitably programmed processors, such as a CPU executing software (e.g., block 204 of FIG. 2). The process 300 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 300 is described with reference to the flowchart illustrated in FIG. 3, it will be appreciated that many other methods of performing the acts associated with process 300 may be used. For example, the order of many of the operations may be changed, and some of the operations described may be optional.

In this example, the process 300 begins when an incremental build trigger is detected. (block 302). For example, an incremental build trigger may occur when documents are added to database, documents are deleted from the database, a fragmentation level exceeds a threshold, and/or based on a manual user input. Subsequently, the system determines that a first sub-index needs to be updated (block 304). For example, the first sub-index may need to be updated if a document was deleted from the database that was referenced by the first sub-index.

The system also determines that a second sub-index does not need to be updated (block 306). For example, the second sub-index may not need to be updated if changes to the database that have occurred since the last incremental build do not affect the second sub-index. A third sub-index based on the first sub-index and an index update is then generated (block 308). For example, the reference to the deleted document may be removed.

Database queries that occur before and during the generation of the third sub-index use the first sub-index and the second sub-index, but not the third sub-index (block 310). For example, a query that occurs during the generation of the third sub-index may allow access to the deleted document. Database queries that occur after the generation of the third sub-index use the second sub-index and the third sub-index, but not the first sub-index (block 312). For example, a query that occurs after the generation of the third sub-index may deny access to the deleted document.

FIGS. 4-7 are block diagrams illustrating example index pointers and example sub-indexes. In the example shown in FIG. 4, a first index pointer 402 points to a first sub-index 404, and a second index pointer 406 points to a second sub-index 408. Subsequently, as shown in FIG. 5, the system starts to build a third sub-index 410. As shown in FIG. 6, when the third sub-index 410 is ready, the first index pointer 402 is moved to the third sub-index 410, and, as shown in FIG. 7, the first sub index 404 is deleted.

In summary, persons of ordinary skill in the art will readily appreciate that methods and apparatus for building a search index for a database have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of incrementally building a Search-Index for a database without rendering the database inoperable, the method comprising:

detecting a trigger to begin an incremental build of the Search-Index;

determining that a particular sub-index of a plurality of sub-indexes that form the Search-Index is to be updated by the incremental build;

generating a new sub-index based on the particular sub-index and an update included in the incremental build, wherein generating the new sub-index enables the incremental build to be built without affecting the particular sub-index directly;

during the generation of the new sub-index, executing a first query of the Search-Index using the particular sub-index, and not the new sub-index; and after the new sub-index is generated:

updating a pointer that pointed to the particular sub-index to point to the new sub-index, and executing a second query of the Search-Index using the new sub-index, and not the particular sub-index.

2. The method of claim 1, wherein the trigger to begin the incremental build includes an addition of a plurality of documents to the database.

3. The method of claim 1, wherein the trigger to begin the incremental build includes a deletion of a plurality documents from the database.

4. The method of claim 1, wherein the trigger to begin the incremental build is based on a fragmentation level.

5. The method of claim 1, wherein the trigger to begin the incremental build includes a manual user input.

6. The method of claim 1, wherein after the third sub-index is generated, the first sub-index is deleted.

7. An apparatus for incrementally building a Search-Index for a database without rendering the database inoperable, the apparatus comprising:

a processor;

a network interface operatively coupled to the processor; and a memory device operatively coupled to the processor, the memory device storing instructions to cause the processor to:

detect a trigger to begin an incremental build of the Search-Index;

determine that a particular of a plurality of sub-indexes that form the Search-Index is to be updated by the incremental build;

generate new sub-index based on the particular sub-index and an update included in the incremental build, wherein generating the new sub-index enables the incremental build to be built without affecting the particular sub-index directly;

during the generation of the new sub-index, execute a first query of the Search-Index using the particular sub-index, and not the new sub-index; and after the third sub-index is generated:
update a pointer that pointed to the particular sub-index to point to the new sub-index, and
execute a second query of the Search-Index using the new sub-index, and not the particular sub-index.

8. The apparatus of claim 7, wherein the trigger to begin the incremental build includes an addition of a plurality of documents to the database.

9. The apparatus of claim 7, wherein the trigger to begin the incremental build includes a deletion of a plurality documents from the database.

10. The apparatus of claim 7, wherein the trigger to begin the incremental build is based on a fragmentation level.

11. The apparatus of claim 7, wherein the trigger to begin the incremental build includes a manual user input.

12. The apparatus of claim 7, wherein after the third sub-index is generated, the first sub-index is deleted.

13. A non-transitory computer readable medium storing instructions structured to cause a computing device to:

detect a trigger to begin an incremental build of a Search-Index;

determine that a particular of a plurality of sub-indexes that form the Search-Index is to be updated by the incremental build;

generate new sub-index based on the particular sub-index and an update included in the incremental build, wherein generating the new sub-index enables the incremental build to be built without affecting the particular sub-index directly;

during the generation of the new sub-index, execute a first query of the Search-Index using the particular sub-index, and not the new sub-index; and after the third sub-index is generated:
update a pointer that pointed to the particular sub-index to point to the new sub-index, and
execute a second query of the Search-Index using the new sub-index, and not the particular sub-index.

14. The computer readable medium of claim 13, wherein the trigger to begin the incremental build includes an addition of a plurality of documents to the database.

15. The computer readable medium of claim 13, wherein the trigger to begin the incremental build includes a deletion of a plurality documents from the database.

16. The computer readable medium of claim 13, wherein the trigger to begin the incremental build is based on a fragmentation level.

17. The computer readable medium of claim 13, wherein the trigger to begin the incremental build includes a manual user input.

18. The computer readable medium of claim 13, wherein after the third sub-index is generated, the first sub-index is deleted.

* * * * *